H. R. IRWIN.
WATER MOTOR.
APPLICATION FILED SEPT. 7, 1909.
1,082,634.
Patented Dec. 30, 1913.
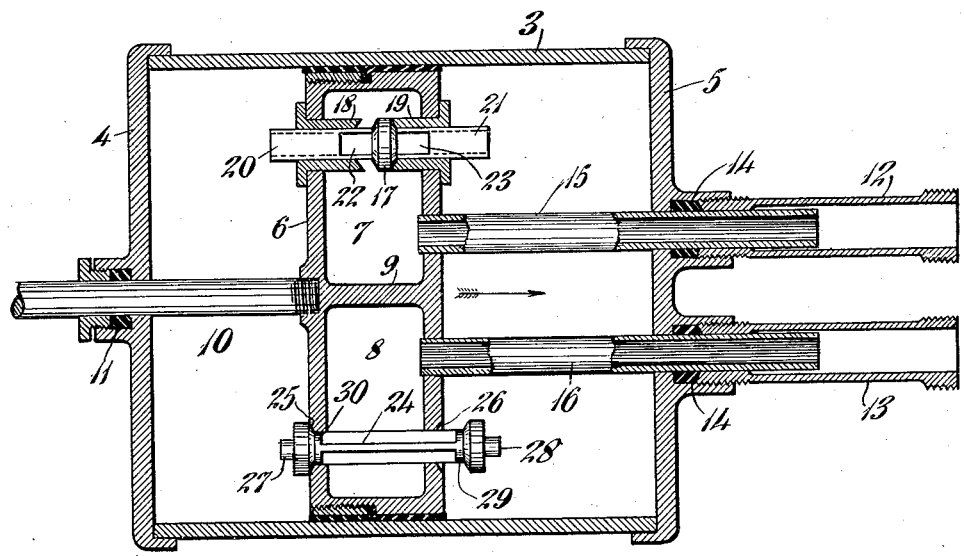
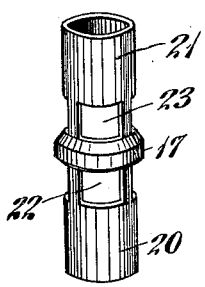
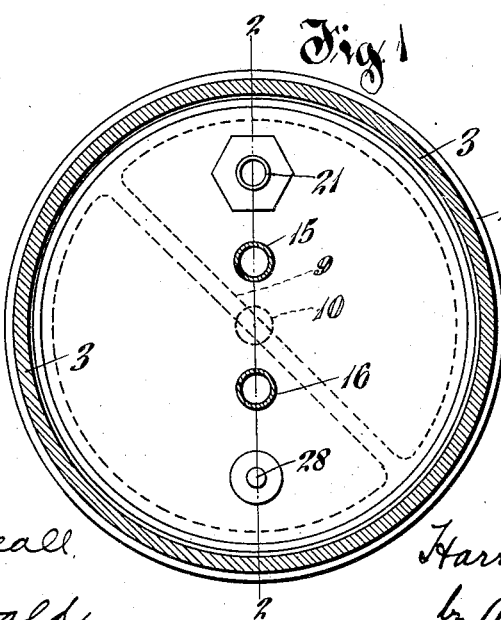
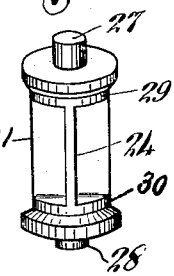
Witnesses
Bessie A. Beall
Arthur H. Ewald
Inventor
Harry R. Irwin
by Alfred M. Allen
Atty

UNITED STATES PATENT OFFICE.

HARRY R. IRWIN, OF NEWPORT, KENTUCKY.

WATER-MOTOR.

1,082,634.  Specification of Letters Patent.  Patented Dec. 30, 1913.

Application filed September 7, 1909. Serial No. 516,367.

*To all whom it may concern:*

Be it known that I, HARRY R. IRWIN, a citizen of the United States, residing in Newport, in the county of Campbell and State of Kentucky, have invented certain new and useful Improvements in Water-Motors, of which the following is a full, clear, and exact description, reference being had to the accompanying drawings, forming part of this specification.

My improvements relate to water motors for driving light machinery and the like, in which a hollow piston is provided divided into an inlet and exhaust chamber, and provided with inlet and exhaust valves, which valves are thrown at the end of the stroke of the piston to shift the water supply from one side of the piston to the other.

I have illustrated my invention with special reference to the reciprocating type of a water motor, although the invention is equally applicable to the rotary type of motor, and, when applied to the rotary type, to constructions in which the hollow valve chamber is mounted on the oscillating piston, or in which the valve chamber is fixed and the oscillating piston is solid.

The object of the invention is to avoid the use of springs for the inlet and exhaust valves, and to make use of the water pressure which is accumulated behind the inlet valve to force it to its opposite seat.

The invention consists of that certain novel construction of inlet and exhaust valves and arrangement of parts to be hereinafter particularly pointed out and claimed.

In the drawings Figure 1 is a cross section taken through the motor cylinder of my improved motor. Fig. 2 is a central longitudinal section taken on the lines 2, 2 of Fig. 1. Fig. 3 is a perspective view of the double puppet inlet valve. Fig. 4 is a perspective view of the double puppet exhaust valve.

3 is the motor cylinder, provided with the heads 4, 5, properly secured on the ends of the cylinder.

6 is the piston which is constructed with a central hollow space divided into two non-communicating chambers 7, 8, by the partition wall 9.

10 is the piston rod passing through the head 4 with suitable stuffing box 11, and provided on its outer end with any suitable means or connecting mechanism for communicating power.

12 is the supply pipe for the water, and 13 the exhaust pipe, which pipes are secured to the head 5, and provided with suitable stuffing boxes 14, 14.

15 is the tube for conveying the supply water to the inlet chamber 7 of the piston, and 16 is the tube for taking off the exhaust water. These tubes are suitably secured to the piston 6, and as the piston is moved the tubes slide back and forth in the stuffing boxes 14.

17 is the double puppet inlet valve which has its seats on either side in the hollow plugs or sleeves 18, 19, secured respectively in the walls of the piston in the inlet chamber.

20, 21 are the valve stems of the inlet valve, and these stems are hollow tubes open at the outer ends, loosely fitting in the plugs 18, 19, and provided with openings 22, 23, at the base of the hollow tubes near the valve seats. The water in passing from the piston inlet chamber into either end of the cylinder passes through these openings 22, 23, and through the hollow stem into the cylinder, while the hollow stems project beyond the outer face of the piston.

24 is the double puppet exhaust valve, provided with valve seats 25, 26 on the outside walls of the piston on each side. This exhaust valve is also provided with the pins 27, 28 projecting behind the head of the valve into the cylinder on each side, and each valve is also provided with a solid cylindrical portion 29, 30 of the same diameter as the wings 31, which connect the two valves. The length of the hollow stem 20 on the inlet valve and the projecting pin 27 of the exhaust valve, and the corresponding lengths of the projecting hollow stem 21 of the inlet valve, and pin 28 of the exhaust valve are such that the pins 27, 28 project from the face of the piston slightly farther than the stems of the inlet valve, when the valves are on their proper seats for the movement of the piston in either direction.

The operation of the motor is as follows: As illustrated in Fig. 2, the supply of water is entering through the tube 15, into the inlet chamber 7, and passing into the left hand end of the cylinder through the openings 22, and the hollow stem 20 of the inlet valve, and the piston is moving in the direction of the arrow from left to right. The inlet valve being seated on the plug 19, and the exhaust valve being on its seat 25 with the exhaust water from the right hand end of the cylinder passing into the chamber 8, and out through the exhaust tube 16. As the pin 28 of the exhaust valve projects slightly beyond the hollow stem 21, when the piston reaches the right hand end of the cylinder, the exhaust valve stem will contact with the head 5 of the cylinder, and slightly unseat the exhaust valve. The exhaust valve, however, is provided with the cylindrical portion 30, which is not projected from the valve opening, so that there is only momentarily a very slight leakage as the exhaust valve is unseated. This is sufficient, however, to overcome the inertia of the exhaust valve, and to relieve the pressure somewhat from the left hand end of the cylinder chamber. There is still a sufficient pressure to carry the piston slightly farther to the right which brings the hollow stem 21 to a seat on the cylinder head 5, and unseats the valve 17 sufficiently to allow the water in the piston chamber 7 to enter the openings 23 in the stem, and fill up the hollow stem 21. This inrush of the water under full pressure into the hollow stem 21, taken with the slight release in the left hand end of the cylinder by the unseating of the exhaust valve, enables sufficient pressure to accumulate in the hollow stem 21 to force the inlet valve into its opposite seat, closing the left hand end of the cylinder and opening the right hand end under full pressure, and by this pressure the exhaust valve is fully actuated and forced to its seat 26.

In the same way as the piston moves on its return stroke, the exhaust valve is first momentarily unseated, then the hollow stem 20 of the inlet valve is closed by coming in contact with the cylinder head 4, and being unseated, the inrush of water into the closed stem projects the valve to its opposite seat, and the motor continues its operation as long as the water pressure is supplied.

By providing for the exhaust valve stem slightly longer than the inlet valve stem, and arranging for the shoulder at the valve seat so that the exhaust valve when unseated will only open to the extent of the looseness of fit in the valve opening, I find that very satisfactory results are obtained and considerable latitude is allowed in the length of the pins on the exhaust valve. So long as the exhaust valve is started from its seat prior to the contact of the hollow inlet valve stem with the cylinder head, with very appreciable wear of the parts the valve will still operate perfectly, and it is not necessary to provide for any great accuracy.

Having thus described my invention what I claim as new and desire to secure by Letters Patent, is:

1. In a water motor, a motor chamber with a movable piston therein, means for supplying water to both sides of said piston, and means for exhausting the water therefrom, an inlet valve and a double puppet exhaust valve to control the exhaust, with extensions within the valve seat to check the exhaust upon the unseating of the exhaust valve.

2. In a water motor, a motor chamber with a movable piston therein, means for supplying water to both sides of said piston and for exhausing the water therefrom, with double puppet, inlet and exhaust valves therefor, said inlet valve having hollow stems projecting into the motor chamber on each side of the piston, with openings beyond the valve seats into said stems for the passage of the water, and to accumulate pressure to fully actuate said valve and the exhaust valve provided with stems projecting into the motor chamber on each side of said piston, slightly beyond the projection of the hollow stems of the inlet valve and means for checking the exhaust upon the initial unseating of the exhaust valve.

3. In a water motor, a motor chamber with a hollow piston therein, having an inlet and an exhaust chamber with double puppet, inlet and exhaust valves therefor, the inlet valve provided with hollow stems projecting into the motor chamber on either side, and having openings beyond the valve seats into said stems, said exhaust valve projecting into said motor chamber on either side slightly beyond the projection of the inlet valve stems, with extensions within the exhaust valve seats to check the exhaust upon the unseating of the exhaust valve.

HARRY R. IRWIN.

Witnesses:
  ARTHUR H. EWALD,
  EARL M. GRIFFIN.